March 7, 1939.    P. SIEDLER ET AL    2,150,134
METHOD FOR THE BLEACHING OF BAST FIBERS
Filed Jan. 10, 1935
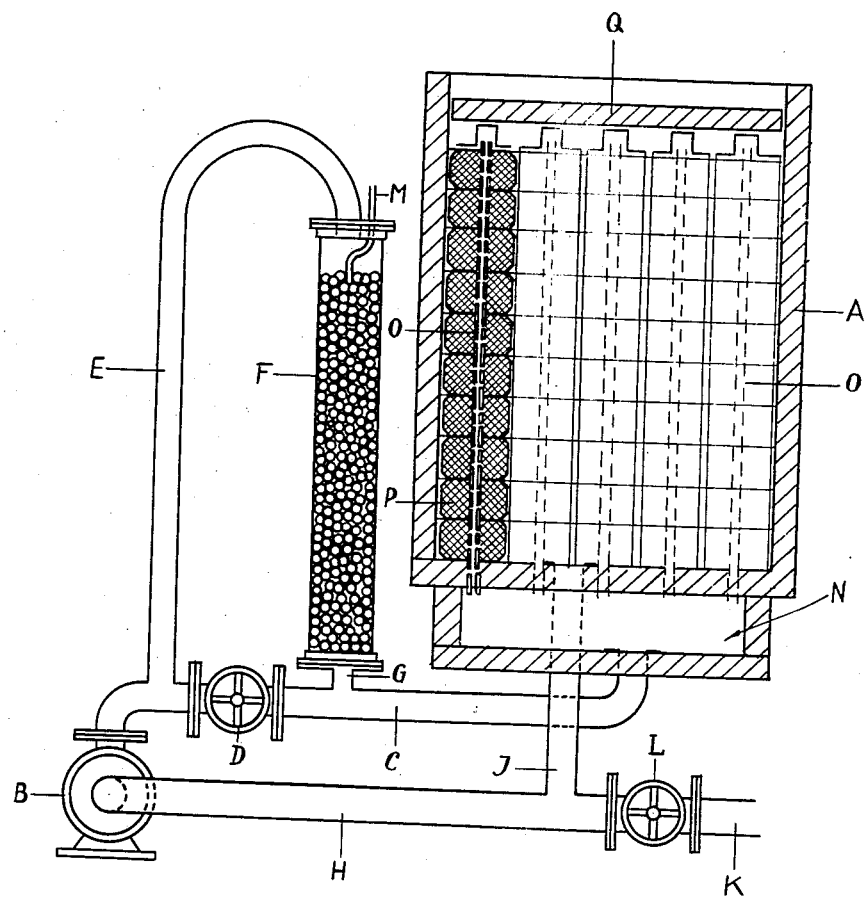
Inventors:
Philipp Siedler,
Erich Kayser,
Helmuth Korte,
Wilhelm Waibel,
BY
Foster, Pierce & Scheffler,
ATTORNEYS.

Patented Mar. 7, 1939

2,150,134

UNITED STATES PATENT OFFICE 2,150,134

METHOD FOR THE BLEACHING OF BAST FIBERS

Philipp Siedler, Erich Kayser, Helmuth Korte, and Wilhelm Waibel, Frankfort-on-the-Main, Germany, assignors to I. G. Farbenindustrie Aktiengesellschaft, Frankfort - on - the - Main, Germany Application January 10, 1935, Serial No. 1,248
In Germany January 20, 1934

3 Claims. (Cl. 8—108)

The present invention relates to a method for the bleaching of bast fibers, particularly on cross-wound bobbins, by chlorinating the impurities with chlorine water.

The bleaching of bast fibers with the aid of chlorine water has hitherto not been satisfactory. The usual method was to prepare the chlorine water separately and to pour this solution into the bleaching apparatus, a proceeding which involved loss of chlorine from the solution before the chlorine could be used, and much trouble due to the presence of chlorine in the atmosphere. Furthermore, the usual chlorine water contains only a relatively low concentration of active chlorine. In bleaching bast fibers, as is known, it is primarily important to chlorinate the more or less lignified impurities which by this operation are converted into an alkali-soluble condition; for this purpose the concentration of chlorine water as previously used does not suffice; particularly when the bast fibers to be chlorinated are placed tightly packed in the bleaching apparatus, because the chlorine water has only a low penetrating action.

The present invention is based upon the observation that these inconveniences and insufficiencies of the bleaching of bast fibers with chlorine water are avoided by combining the preparation of saturated or supersaturated chlorine water and the introduction of this chlorine water into the bleaching vessel in one operation. For this purpose the apparatus for the preparation of the chlorine water may be constructed in such a manner that it may yield strongly supersaturated chlorine water, namely so that the chlorine contained in the apparatus is introduced into the water under a raised pressure; this apparatus is combined with the bleaching device so as to form a closed system. The supersaturated chlorine water is thus caused to act directly on the bast fibers and has no opportunity of losing chlorine in excess of saturation under atmospheric pressure. The chlorine water may also be caused to act on the bast fibers under raised pressure.

In this manner it is possible to treat bast fibers tightly packed (hank yarn) or on cross-wound bobbins with supersaturated chlorine water to such an extent that the lignin substances are completely chlorinated, no stains being formed. By connecting the apparatus for the formation of supersaturated chlorine water with the bleaching apparatus loss of chlorine is avoided because the excess of chlorine is eagerly absorbed by the bodies accessible to the chlorination. Furthermore, a sufficient concentration of the chlorine dissolved in the water is maintained; this concentration facilitates the penetrating action of the chlorination.

It may be advisable to operate as follows: The chlorine water is conducted through the material to be bleached and then returned in circulation to the apparatus for the preparation of the supersaturated chlorine water; in this apparatus it is again supersaturated with chlorine and then caused to act again on the bleaching material.

The accompanying drawing illustrates by way of example an apparatus for carrying out the method.

The bast fibers, for instance, on cross-wound bobbins, are contained in a suitable bleaching apparatus A through which the liquor is caused to circulate by a pump B. In the high-pressure piping C of the pump there may be a throttle valve D. In front of this valve there is arranged a branch pipe E which discharges into the upper part of the apparatus F serving for the preparation of the chlorine water. This apparatus preferably consists of a column F charged with filling bodies. Into this column water is introduced through the inlet pipe E while chlorine is simultaneously introduced through the inlet pipe M. By bringing the water and the chlorine into contact with each other under pressure in this column, the two phases are brought in a finely divided form by the action of the filling bodies, so that supersaturated chlorine water is formed. From the lower part of the column the chlorine water is discharged through the pipe G into the high-pressure piping C. The discharge pipe J of the bleaching apparatus opens into the suction pipe H of the pump. The pipe K which may be closed by the valve L serves for drawing off the liquor and for introducing fresh water. The apparatus is operated for instance as follows:— It is filled with tap water while the valve L is opened and the valve D is closed. The valve L is then closed and the water is caused to circulate rapidly by means of the pump. At the same time chlorine is introduced from a pressure bottle through the pipe M into the column F so that chlorine water is produced, the pressure being adjusted according to demand. By partially opening the valve D it is possible to regulate to a large extent the quality of water running through the column F and consequently the concentration of the chlorine water. Through the high-pressure piping C the chlorine water leaving the column F is forced into the header N whence it rises into the pipes O having lateral openings. On these pipes the cross-wound bobbins P are placed. From the openings of the pipes O the chlorine water is discharged into the cross-wound bobbins through which it flows to return by way of the pipes J and H into the pump B. If the method of bleaching has to be performed with application of pressure, it is necessary to provide the lid Q of the bleaching vessel with a tightening device and to make the vessel capable of resisting pressure.

We claim:

1. A method for the bleaching of bast fibers by chlorinating the impurities with chlorine water, which comprises causing the chlorine water to act directly after it has been prepared on the bast fibers on cross-wound bobbins.

2. A method for the bleaching of bast fibers by chlorinating the impurities with chlorine water, which comprises causing the chlorine water in a supersaturated form to act directly after it has been prepared on the bast fibers on cross-wound bobbins.

3. A method for the bleaching of bast fibers by chlorinating the impurities with chlorine water which comprises causing the chlorine water in a supersaturated form to act directly after it has been prepared on the bast fibers on cross-wound bobbins and returning the chlorine water, after having been caused to act on the bleaching material, in circulation to the apparatus for preparing the chlorine water where it is supersaturated again with newly added chlorine.

PHILIPP SIEDLER.
ERICH KAYSER.
HELMUTH KORTE.
WILHELM WAIBEL